(12) United States Patent
Chung et al.

(10) Patent No.: US 10,552,804 B2
(45) Date of Patent: Feb. 4, 2020

(54) METHODS AND SYSTEMS FOR PROVIDING SUBSIDIZED ACCESS TO NETWORK CONTENT BY WAY OF A SECURE CONNECTION

(71) Applicant: Verizon Patent and Licensing Inc., Arlington, VA (US)

(72) Inventors: Jae Won Chung, Lexington, MA (US); Avinash S. Chugh, Nashua, NH (US); Rangamani Sundar, Lexington, MA (US); Manian Krishnamoorthy, Hyannis, MA (US); Damascene M. Joachimpillai, Westford, MA (US); Raymond C. Counterman, Canton, MA (US); Mark S. Richardson, Hollis, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 922 days.

(21) Appl. No.: 14/590,979

(22) Filed: Jan. 6, 2015

(65) Prior Publication Data
US 2015/0118991 A1   Apr. 30, 2015

Related U.S. Application Data

(63) Continuation-in-part of application No. 13/458,362, filed on Apr. 27, 2012, now Pat. No. 9,489,666.

(60) Provisional application No. 61/480,418, filed on Apr. 29, 2011, provisional application No. 61/556,887, filed on Nov. 8, 2011, provisional application No. 61/568,123, filed on Dec. 7, 2011, provisional application No. 61/602,814, filed on Feb. 24, 2012.

(51) Int. Cl.
*G06Q 20/02* (2012.01)
*H04W 12/08* (2009.01)
*H04M 15/00* (2006.01)

(52) U.S. Cl.
CPC .......... *G06Q 20/027* (2013.01); *H04W 12/08* (2013.01); *H04M 15/48* (2013.01)

(58) Field of Classification Search
USPC ....................................................... 705/52
See application file for complete search history.

(56) References Cited

U.S. PATENT DOCUMENTS 5,584,035 A   12/1996  Duggan et al.
6,314,283 B1  11/2001  Fielden
(Continued)

*Primary Examiner* — Zeshan Qayyum

(57) ABSTRACT

An exemplary method includes a subsidized access management system detecting a request provided by an access device associated with a user to access network content by way of a secure connection within a network provided by a network service provider, the network content associated with a content provider and maintained by a content provider system, determining that a data usage charge for access by the user to the network content by way of the secure connection within the network is subsidized by the content provider in accordance with a subsidized access arrangement between the content provider and the network service provider, and providing the user with subsidized access to the network content by way of the secure connection within the network in accordance with a rule set associated with the subsidized access arrangement. Corresponding methods and systems are also disclosed.

17 Claims, 10 Drawing Sheets

(56) References Cited

U.S. PATENT DOCUMENTS

| | | | |
|---|---|---|---|
| 6,941,129 B2 | 9/2005 | Marce et al. | |
| 8,041,341 B1 | 10/2011 | Malackowski et al. | |
| 8,254,904 B1 | 8/2012 | Radoshinsky et al. | |
| 9,275,405 B1* | 3/2016 | Delker | G06Q 30/04 |
| 9,288,230 B2* | 3/2016 | Ahmavaara | H04L 63/101 |
| 2004/0003383 A1 | 1/2004 | Chenier | |
| 2005/0021862 A1* | 1/2005 | Schroeder | G06Q 30/02 |
| | | | 709/246 |
| 2010/0031022 A1 | 2/2010 | Kramer | |
| 2010/0223096 A1 | 9/2010 | Bosan et al. | |
| 2010/0227611 A1 | 9/2010 | Schmidt et al. | |
| 2011/0295751 A1 | 12/2011 | Matsuo et al. | |
| 2012/0036051 A1 | 2/2012 | Sachson | |
| 2012/0155380 A1* | 6/2012 | Hodges | G06Q 30/00 |
| | | | 370/328 |

* cited by examiner

METHODS AND SYSTEMS FOR PROVIDING SUBSIDIZED ACCESS TO NETWORK CONTENT BY WAY OF A SECURE CONNECTION

RELATED APPLICATIONS

The present application is a continuation-in-part application of U.S. patent application Ser. No. 13/458,362, filed Apr. 27, 2012, which application claims priority under 35 U.S.C. § 119(e) to U.S. Provisional Patent Application No. 61/480,418, filed Apr. 29, 2011, U.S. Provisional Patent Application No. 61/556,887, filed Nov. 8, 2011, U.S. Provisional Patent Application No. 61/568,123, filed Dec. 7, 2011, and U.S. Provisional Patent Application No. 61/602,814, filed Feb. 24, 2012. The contents of each of these applications are hereby incorporated by reference in their entirety.

BACKGROUND INFORMATION

Network service providers (e.g., wireless carriers, Internet service providers, etc.) often charge users to access network content by way of the providers' networks based on the amount of data that the users utilize while accessing the network content. For example, a network service provider may impose a maximum data usage amount per billing period (i.e., a data usage quota) with excess data usage being billed separately, charge a predetermined amount per unit of data usage (e.g., when a wireless device user is roaming on another wireless network), or allow a user to pre-pay for a predetermined amount of data usage.

Unfortunately, none of these billing arrangements differentiate between the types of network content accessed by a user. In other words, a user is charged in the same manner regardless of the particular website, network-based application (e.g., mobile device application or "app"), network-based service, advertisement, or other type of network content that the user accesses. As a result, many users may refrain from accessing various types of network content (e.g., certain mobile device apps, video content, advertisement content, and other potentially high-bandwidth network content) because they do not want access to such content to count against their predetermined data usage limits and/or because they do not want to pay for the data used in accessing such network content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
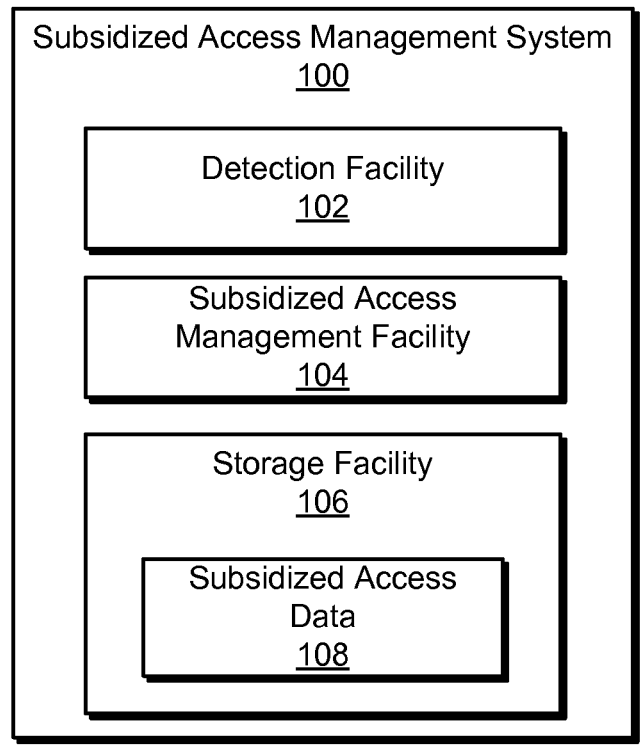
FIG. 1 illustrates an exemplary subsidized access management system according to principles described herein.

Methods and systems for providing subsidized access to network content by way of a secure connection are described herein. For example, as will be described below, a subsidized access management system may detect a request provided by an access device associated with a user to access network content by way of a secure connection within a network provided by a network service provider. The network content may be associated with (e.g., provided by) a content provider and maintained by a content provider system. In this example, the subsidized access management system may determine that a data usage charge for access by the user to the network content by way of the secure connection within the network is subsidized by the content provider in accordance with a subsidized access arrangement between the content provider and the network service provider, and provide the user with subsidized access to the network content by way of the secure connection within the network in accordance with a rule set associated with the subsidized access arrangement.

To illustrate, a subsidized access management system (e.g., one or more servers and/or other network elements managed by a network service provider) may detect that a mobile device (e.g., a mobile phone) establishes a communication session between the mobile device and a content provider server associated with a content provider by way of a wireless carrier network (e.g., a 3G or 4G wireless carrier network) provided by the network service provider. For example, the subsidized access management system may detect that the mobile device uses the wireless carrier network to load a webpage maintained by the content provider server and that includes a secure link (e.g., a Hypertext Transfer Protocol Secure ("HTTPS") link) to network content by way of a secure connection (e.g., a Transport Layer Security ("TLS") or Secure Sockets Layer ("SSL") connection).

In response, the subsidized access management system may determine that the content provider will provide the user with subsidized access to the network content (e.g., by paying for any data usage charges incurred by the user if the user selects the link in order to access the network content). In response to determining that the content provider will provide the user with subsidized access to the network content, the subsidized access management system may track an amount of data transmitted between the access device and the content provider server during the communication session (e.g., while the user accesses various content offerings accessible through the webpage).

At some point while the user is interacting with the webpage, the user may select the secure link. In so doing, a secure connection is established between the access device and the content provider server. Because data transmitted between the access device and the content provider server by way of the secure connection is encrypted, the subsidized access management system relies on a server-side plugin ("SSP") residing on the content provider server to provide the subsidized access management system with data identifying a universal resource identifier ("URI") associated with the secure link, data identifying a start time that indicates a time during the communication session at which the access device starts accessing the network content by way of the secure connection, and data representative of an end time that indicates a time during the communication session at which the access device stops accessing the network content. The subsidized access management system may then determine an amount of data that is to be charged to the content provider based on the tracked amount of data, the URI, the start time, and the end time.

The methods and systems described herein may allow a content provider to subsidize access by a user to network content by way of a secure connection within a network associated with a particular network service provider. Subsidized access to network content may encourage or incentivize users to access the network content, thereby providing content providers and/or their network content with increased exposure, traffic, and/or revenue. Likewise, subsidized access to network content may allow users to experience and enjoy network content that they may not otherwise choose to access due to the typical data usage charges associated therewith.

As used herein, a "secure connection" refers to a TLS, SSL, or other type of network connection between computing devices (e.g., an access device and a content provider system) that is encrypted or otherwise secure.

As used herein, "network content" refers to any data, service, or content (e.g., Internet content) that may be accessed by way of a network (e.g., by way of a secure connection within a network). For example, network content may include, but is not limited to, a website, a network-based application (e.g., an application configured to be executed by a mobile device), a network-based service (e.g., an email service, a global positioning service ("GPS") service, a navigation service, etc.), advertisement content (e.g., web-based advertisements, banner advertisements, pop-up advertisements, etc.), media content (e.g., video and/or audio content), and/or any other type of content accessible by way of a network as may serve a particular implementation. Network content to which access is subsidized may be referred to herein as "subsidized network content," "sponsored network content," and/or "sponsored data."

As used herein, a "network service provider" may include any entity configured to provide one or more network access services (e.g., wireless data access services) to a user (e.g., a subscriber). For example, a network service provider may include, but is not limited to, a wireless carrier, a wireless network provider, an Internet service provider, a subscriber television service provider, and/or any other type of provider of network access services as may serve a particular implementation.

As used herein, a "content provider" may include any entity or person associated with network content other than a network service provider. For example, a content provider may include, but is not limited to, a website owner, an application developer, an application provider, an advertisement provider, an entity (i.e., a third party entity) other than the entity that actually provides and/or maintains the network content, etc.

As used herein, a content provider may "subsidize" or "sponsor" a data usage charge for access by a user to network content by way of a network in any suitable manner. For example, the content provider may pay for all or part of the data usage charge in accordance with a subsidized access arrangement between the content provider and the network service provider. In this manner, the user may access the network content for free or at a reduced cost. A data usage charge for a user may additionally or alternatively be subsidized by reducing (e.g., eliminating) an amount of data that is counted against a user's data usage quota while the user accesses the network content, refunding all or part of the data usage charge to the user, and/or upgrading a quality of service (e.g., speed) for the data used to access the network content free-of-charge to the user. Data subsidies may also be provided to the user by way of coupons, promotion codes, discounts, bundled pricing, etc. Other ways of subsidizing a data usage charge may also be used in accordance with the methods and systems described herein. For example, in some embodiments, the network service provider may subsidize the data usage charge in accordance with the methods and systems described herein.

FIG. 1 illustrates an exemplary subsidized access management system 100 ("system 100") configured to facilitate subsidized access by a user to network content. As shown, system 100 may include, without limitation, a detection facility 102, a subsidized access management facility 104 ("management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Storage facility 106 may maintain subsidized access data 108 generated and/or used by detection facility 102 and/or management facility 104. For example, subsidized access data 108 may include, but is not limited to, data representative of a rule set associated with a subsidized access arrangement, tracked data usage, etc. Storage facility 106 may maintain additional or alternative data as may serve a particular implementation.

Detection facility 102 may detect a request provided by an access device (e.g., a mobile device, a computing device, etc.) associated with a user to access network content by way of a secure connection within a network provided by a network service provider (i.e., a "service provider network"). In some examples, the network content may be associated with (e.g., provided by) a content provider and maintained by a content provider system that is separate from system 100. Exemplary manners in which detection facility 102 may detect the request provided by the access device to access the network content by way of the secure connection will be described below.

Management facility 104 may perform one or more subsidized access management operations. For example, management facility 104 may determine that a data usage charge for access by the user to the network content by way of the secure connection within the network is subsidized by the content provider in accordance with a subsidized access arrangement between the content provider and the network service provider. The subsidized access arrangement may include any suitable agreement, contract, and/or arrangement in which the content provider has agreed to subsidize access by one or more users to network content associated with (e.g., provided by) the content provider. To illustrate, an exemplary subsidized access arrangement may specify that a website owner has agreed to subsidize access by one or more users who access the website by way of a wireless provider's network. It will be recognized that other subsidized access arrangements between any type of content provider and network service provider may be realized in accordance with the methods and systems described herein. Exemplary manners in which management facility 104 may determine that the data usage charge is subsidized by the content provider will be described below.

Once management facility 104 has determined that the data usage charge is subsidized by the content provider, management facility 104 may provide the user with subsidized access to the network content by way of the secure connection within the network in accordance with a rule set associated with the subsidized access arrangement.

As used herein, a "rule set" associated with a subsidized access arrangement between a content provider and a network service provider includes one or more rules that define a manner in which user access to network content by way of a network associated with the network service provider is subsidized by the content provider. For example, a rule set may include one or more rules that identify the particular network content to be subsidized, define an amount that the content provider has agreed to subsidize, and/or define a manner in which the content provider will reimburse the network service provider when a user accesses the network content. The rule set may additionally or alternatively specify one or more terms and/or conditions that have to be met in order for the content provider to subsidize user access to network content. For example, the rule set may include one or more rules specifying specific time periods (e.g., times of day, days of week, holidays, etc.) during which the content provider will subsidize user access to the network content, specific geographic or access device network address-based locations from which a user has to access the network content in order for the content provider to subsidize access by the user to the network content, specific user profile characteristics that the user has to meet in order to receive subsidized access to the network content, specific types of content (e.g., audio-based content, video-based content, Internet-based content, etc.) to which the content provider will subsidize user access, promotion codes or coupons that users may enter in order to receive subsidized access to the network content, additional network content to which the content provider will subsidize user access in exchange for accessing the network content, and/or any other condition as may serve a particular implementation.

Exemplary manners in which management facility 104 may provide the user with subsidized access to the network content by way of the secure connection within the network in accordance with the rule set associated with the subsidized access arrangement will be described below.

Figure 2:
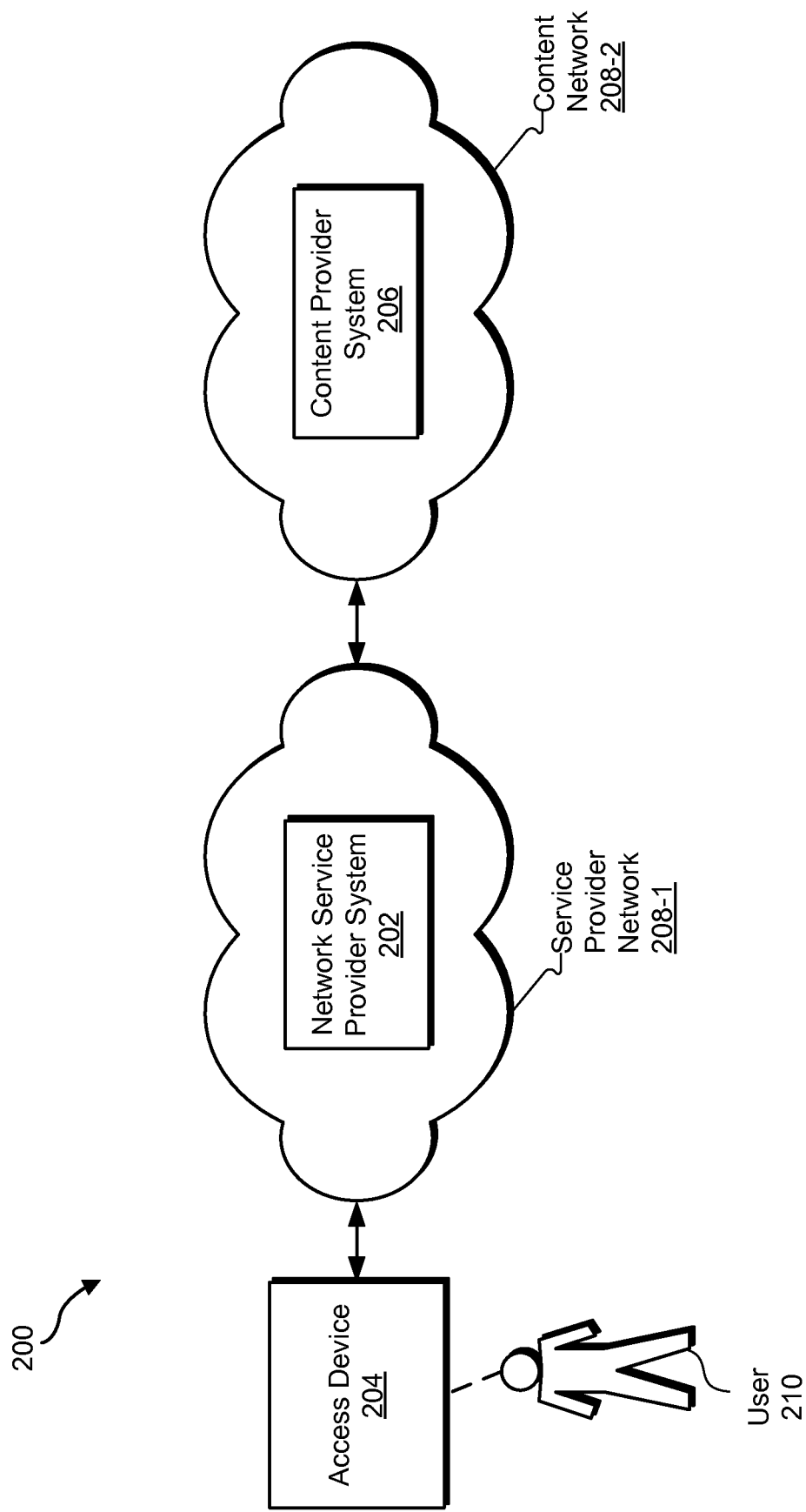
FIG. 2 illustrates an exemplary configuration in which the subsidized access management system of FIG. 1 is entirely implemented by a network service provider system according to principles described herein.

FIG. 2 illustrates an exemplary configuration 200 in which system 100 is entirely implemented by a network service provider system 202. As shown, configuration 200 may also include an access device 204 and a content provider system 206. Network service provider system 202 is associated with (i.e., located within) a service provider network 208-1 and content provider system 206 is associated with (i.e., located within) a content network 208-2. Each of these elements will now be described in detail.

Access device 204 may be configured to facilitate access by a user 210 to network content associated with (e.g., provided by) content provider system 206. To this end, as will be described below, access device 204 may communicate with content provider system 206 by way of service provider network 208-1 and content network 208-2. Access device 204 may be implemented by any suitable access device, such as a mobile or wireless device (e.g., a mobile phone and/or a tablet computer), a personal computer, a set-top box device, a digital video recorder ("DVR") device, a personal-digital assistant device, a gaming device, a television device, and/or any other suitable computing device configured to access network content.

Network service provider system 202 may be associated with (e.g., provided and/or managed by) a network service provider and may be configured to provide one or more network access services (e.g., wireless data access services) to access device 204. For example, network service provider system 202 may manage (e.g., track, allow, disallow, route, etc.) network traffic (i.e., data) that flows through service provider network 208-1. To this end, network service provider system 202 may be implemented by one or more gateways, routers, servers (e.g., DNS servers and/or billing management servers), and/or other network components as may serve a particular implementation.

Content provider system 206 may be associated with (e.g., provided and/or managed by) any suitable network content provider and may be configured to provide network content that may be accessed by access device 204. Hence, content provider system 206 may be implemented by any combination of computing devices (e.g., servers) as may serve a particular implementation.

Access device 204, network service provider system 202, and content provider system 206 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, access device 204, network service provider system 202, and content provider system 206 may communicate by way of service provider network 208-1 and content network 208-2. Service provider network 208-1 may include any provider-specific network (e.g., a wireless carrier network or a mobile telephone network). Content network 208-2 may include a content provider-specific network, the Internet, or any other suitable network associated with content provider system 206. Data may flow between service provider network 208-1 and content network 208-2 using any suitable communication technologies, devices, media, and protocols as may serve a particular implementation.

While two interconnected networks 208-1 and 208-2 (collectively "networks 208") are shown in FIG. 2, it will be recognized that networks 208 may be combined into a single network in accordance with the methods and systems described herein. Likewise, it will be recognized that access device 204 may access network content by way of more than two interconnected networks in accordance with the methods and systems described herein as may serve a particular implementation.

Figure 3:
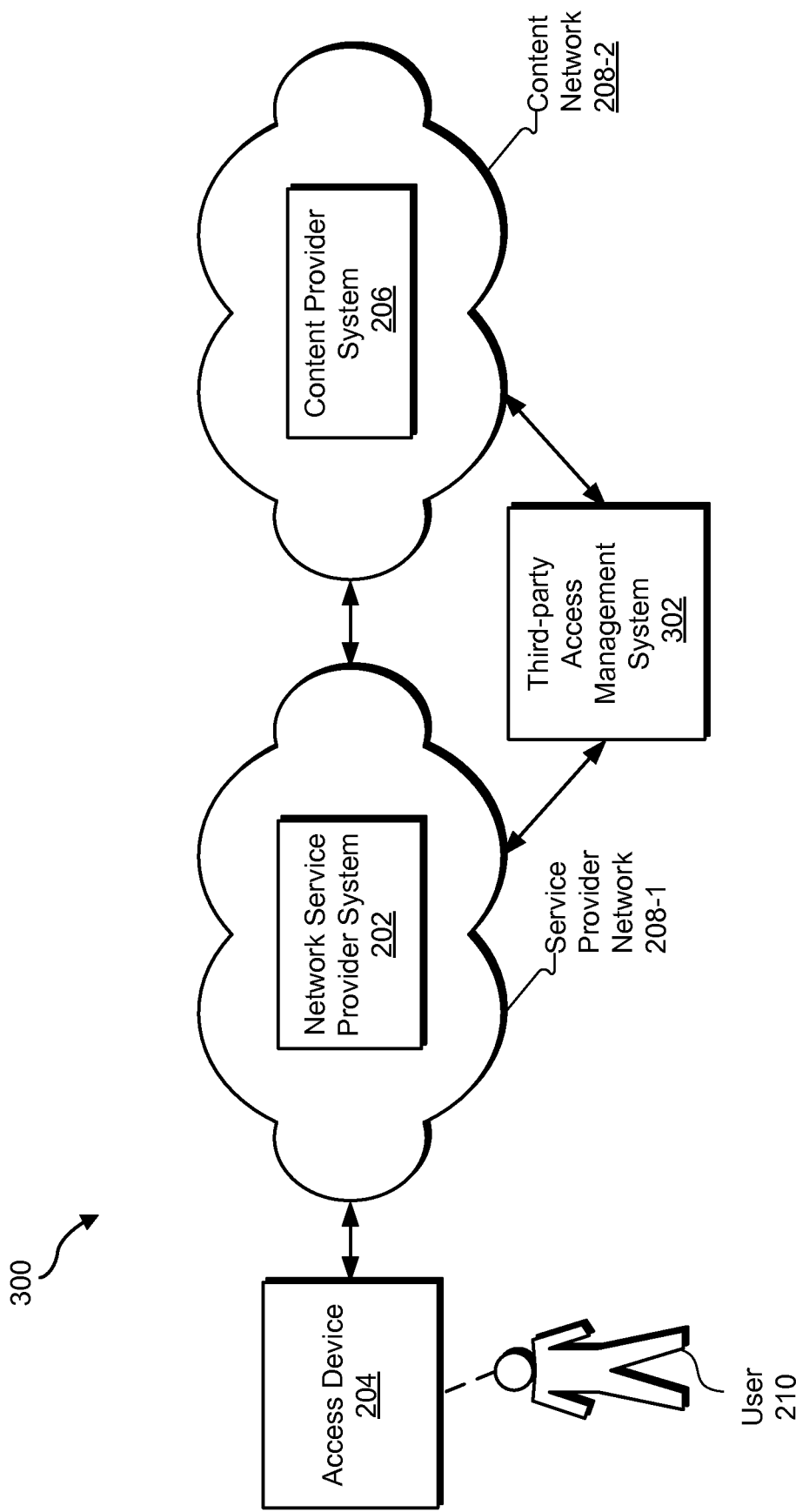
FIG. 3 illustrates another exemplary configuration in which the subsidized access management system is implemented by a third-party access management system according to principles described herein.

FIG. 3 illustrates another exemplary configuration 300 in which system 100 is implemented by a third-party access management system 302 ("third-party system 302"). Third-party system 302 may perform any operation associated with providing subsidized access by a user to network content. Hence, third-party system 302 may be implemented by any suitable combination of one or more computing devices. For example, third-party system 302 may be implemented by one or more servers (e.g., proxy servers).

Third-party system 302 may be managed by a third party entity separate from the network service provider and the content provider. In this configuration, third-party system 302 may be used to provide subsidized access to network content by way of various different service provider networks (e.g., by way of various different wireless carrier networks).

As shown, third-party system 302 may be communicatively coupled to both service provider network 208-1 and to content network 208-2. However, it will be recognized that third-party system 302 may alternatively be communicatively coupled only to (i.e., a part of) either service provider network 208-1 or content network 208-2.

In some examples, system 100 is entirely implemented by third-party system 302. Alternatively, system 100 may be implemented by third-party system 302 and network service provider system 202.

Exemplary manners in which system 100 may provide a user of an access device with subsidized access to network content by way of a secure connection within a network in accordance with a rule set associated with a subsidized access arrangement will be described below. The examples provided herein will be within the context of configuration 200 (i.e., with system 100 being implemented by network service provider system 202). However, it will be recognized that configuration 300 may alternatively be used to provide the subsidized access.

In some examples, a content provider may desire to provide users with subsidized access to network content that is maintained by content provider system 206 and that is accessed by way of a secure connection within service provider network 208-1. For example, the content provider may desire to provide users with subsidized access to network content accessed by way of a secure link (e.g., an HTTPS link) included in a webpage (also referred to as a "referrer page") provided by the content provider (or any other entity). The link may be represented within the webpage by an image, text, and/or any other graphical object as may serve a particular implementation. It will be recognized that the link may alternatively be included in a mobile application and/or any other type of network content as may serve a particular implementation.

To facilitate the subsidized access to the network content, the content provider may create a sponsored data campaign (e.g., by way of a portal provided by system 100) with the network service provider. In other words, the content provider may enter into a subsidized access arrangement with the network service provider that specifies that the content provider will subsidize user access to the network content maintained by content provider system 206. During the sponsored data campaign creation process, the content provider may specify a rule set that defines a manner in which user access to the network content maintained by content provider system 206 is to be subsidized by the content provider. For example, the rule set may specify that only certain users (e.g., only first time visitors to the website) will receive subsidized access to the network content, an amount of time that each user may receive subsidized access to the network content, an amount of data that the content provider will subsidize for each user, and/or an overall quota associated with the subsidized access (e.g., a total amount of data that the content provider will subsidize or sponsor within a predetermined time period). Other rules may be specified as may serve a particular implementation.

In response to a content provider creating the sponsored data campaign, system 100 may provide the content provider with a snippet identifier ("ID") associated with the sponsored data campaign (e.g., by transmitting the snippet ID to content provider system 206). The snippet ID may include a piece of code (e.g., HTML code, XML code, etc.) that may identify the sponsored data campaign associated with the network content that is to be subsidized by the content provider. In some examples, content provider system 206 may tag (e.g., surround) the secure link with the snippet ID in order to identify the link as being associated with sponsored network content. For example, the link may include a URI of "https://host/dir/page.html" and the snippet ID may be represented by "class=123 topLeft". In this example, the link may be tagged with the snippet ID as follows: <a href="https://host/dir/page.html" class="123 topLeft"> This is an SD link.sn/eUg</a>. A link may be tagged with the snippet ID in any other suitable manner. For purposes of the examples provided herein, a link that has been tagged with a snippet ID is referred to as an "original link" and the URI included in the original link is referred to as an "original URI".

In some examples, system 100 may also provide content provider system 206 with a script (e.g., a JavaScript) that may also be embedded in the webpage that includes the original link. When access device 204 loads the webpage, a communication session (e.g., a TCP session) between access device 204 and content provider system 206 is established. In response to the establishment of the communication session, the script may automatically run and harvest links that have been tagged with snippet IDs. Once the script harvests the original link, the script may direct content provider system 206 to transmit a request (e.g., a Java Script Object Notification ("JSON") request) to system 100. The request may include data representative of the original URI and the snippet ID.

Upon receiving the request, system 100 may determine whether the user is eligible to receive subsidized access to the network content associated with the original link. This determination may be performed in any suitable manner. For example, system 100 may retrieve subscriber information associated with the user from a pilot-packet/mobile directory number ("MDN") database using a source IP address and port associated with the request and use the subscriber information to determine whether the user is eligible for subsidized access to the network content.

System 100 may also determine, in response to receiving the request, whether the content provider has enough quota to provide the user with subsidized access to the network content. This determination may be performed in any suitable manner. For example, system 100 may use the snippet ID to identify the quota as specified in the rule set associated with the subsidized access arrangement between the content provider and the network service provider. System 100 may then identify how much data system 100 has already subsidized and compare the identified data with the quota to determine whether the content provider has enough quota to provide the user with subsidized access to the network content.

In response to determining that the user is eligible to receive subsidized access to the network content and that the content provider has enough quota to provide the user with the subsidized access, system 100 may create a modified URI that includes the original URI combined with data indicating that the user is eligible to receive the subsidized access to the network content for a predetermined amount of time. For example, system 100 may create a modified URI that includes the original URI, data representative of the snippet ID, data representative of an expiration time that indicates when the subsidized access to the network content expires, and data representative of a signature that includes an identifier of the access device 204 (e.g., a token that includes an encoded MDN of the access device 204). System 100 may then direct (e.g., in the form of a JSON response) content provider system 206 to replace the original link within the webpage with a modified link associated with the modified URI. In some examples, both the original and the modified links are secure links.

Content provider system 206 may replace the original link within the webpage with the modified link in any suitable manner. For example, content provider system 206 may replace the original link with the modified link by modifying code (e.g., HTML code) representative of the webpage. In some examples, content provider system 206 may present a notification (e.g., text, an image, or any other graphical object) within the webpage indicating that access to the network content represented by the modified link will be subsidized by the content provider.

Once the original link within the webpage has been replaced with the modified link, the user may select the modified link in order to access the subsidized network content associated with the modified link. System 100 may detect that the user selects the modified link and provide the user with the subsidized access to the network content, as will be described in more detail below.

In response to the modified link being selected by the user, a secure connection between access device 204 and content provider system 206 is established. In some instances, system 100 cannot read the data transmitted back and forth between access device 204 and content provider system 206 by way of the secure connection because of the secure nature of the connection. Hence, in order to provide the user with subsidized access to the network content by way of the secure connection, system 100 may track (e.g., count) an amount of data transmitted between access device 204 and content provider system 206 and rely on a server-side plugin residing on content provider system 206 to provide system 100 with data that may be used by system 100 together with the tracked amount of data to determine an amount of data that is to be charged to the content provider. This will be described in more detail below.

Figure 4:
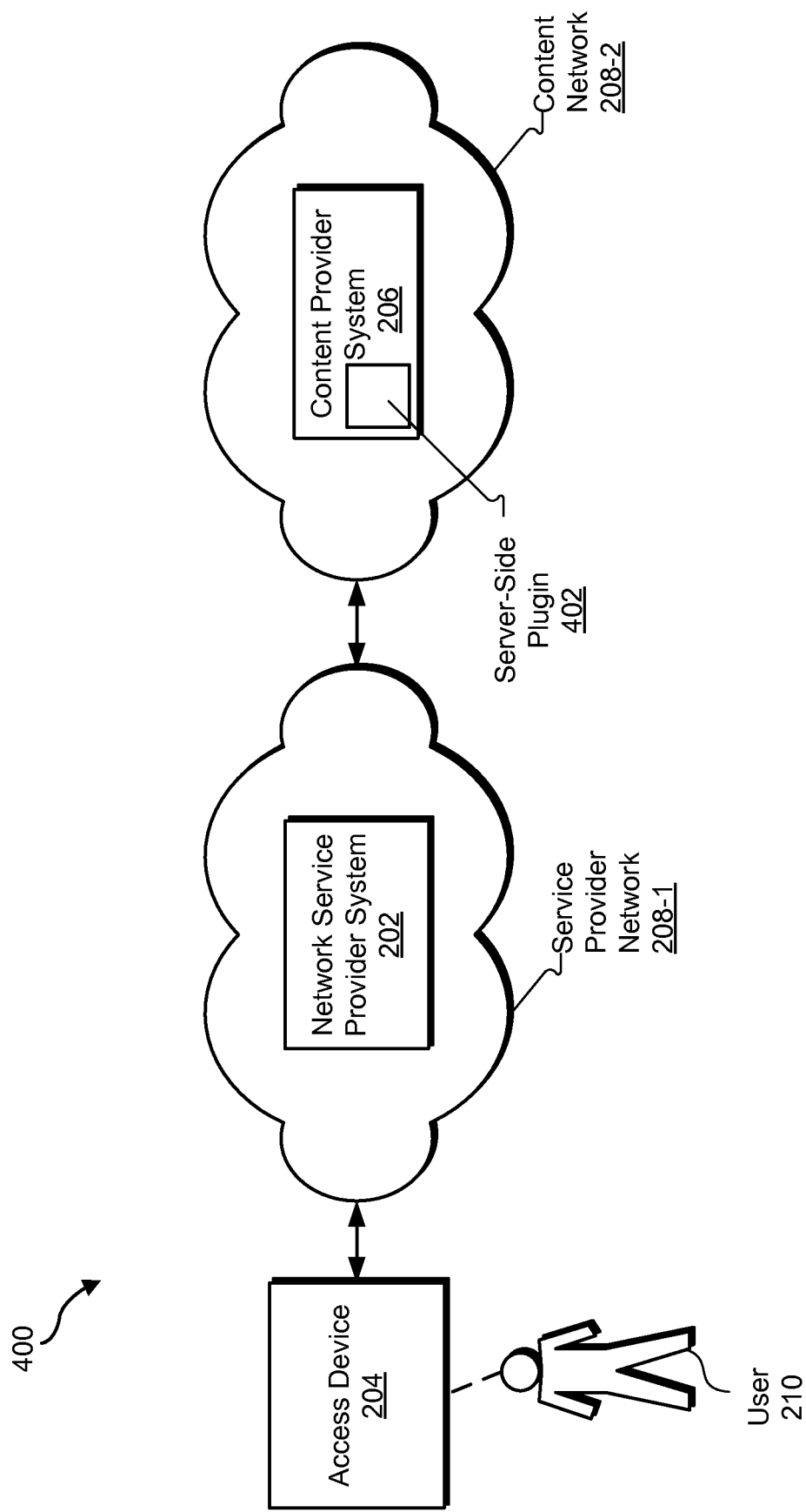
FIG. 4 shows an exemplary configuration in which a server-side plugin resides on a content provider system according to principles described herein.

FIG. 4 shows an exemplary configuration 400 in which a server-side plugin 402 resides on content provider system 206. Configuration 400 is otherwise the same as configuration 200. In some examples, server-side plugin 402 may be provided by system 100 for installation on content provider system 206. Content provider system 206 may alternatively obtain server-side plugin 402 in any suitable manner.

Server-side plugin 402 may transmit data to system 100 that may be used by system 100 to determine an amount of data that is to be charged to the content provider when a user accesses subsidized network content with access device 204. For example, in response to access device 204 providing a request to access network content by way of the secure connection represented by the modified link, server-side plugin 402 may transmit data representative of the URI associated with the network content and data representative of a start time. The start time indicates a time during the communication session at which access device 204 starts accessing the network content by way of the secure connection. As will be described in more detail below, system 100 may use the URI and the start time to determine an amount of data that is to be charged to the content provider while the user accesses the network content.

In some examples, server-side plugin 402 may be initialized in response to access device 204 loading the webpage that contains the secure link associated with the network content. In some examples, the initialization process may synchronize the clock used by content provider system 206 and the clock used by system 100 so that the timing information reported by server-side plugin 402 is accurate.

Figure 5:
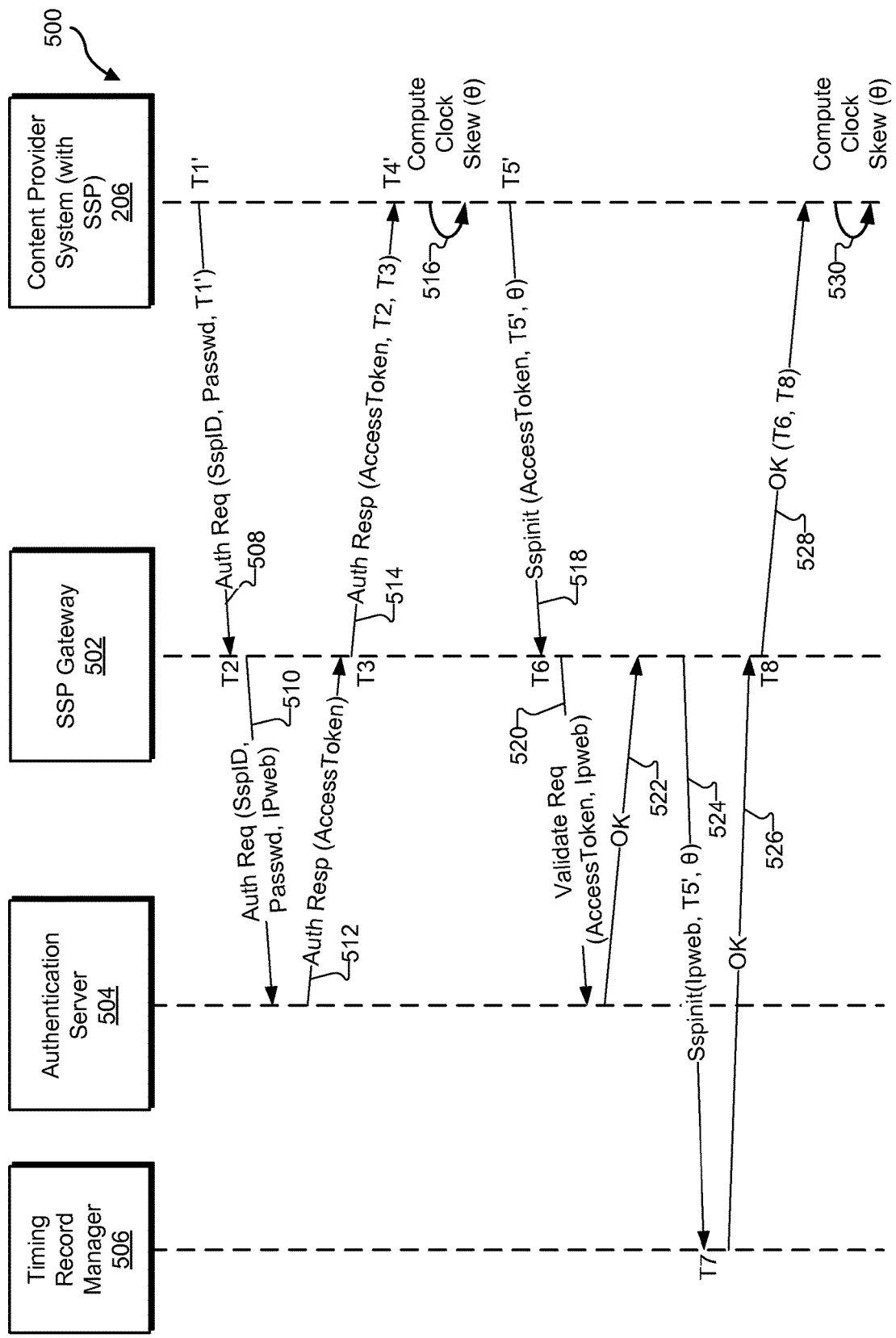
FIG. 5 shows an exemplary sequence diagram that illustrates various steps involved in initializing a server-side plugin according to principles described herein.

FIG. 5 shows an exemplary sequence diagram 500 that illustrates various steps involved in initializing server-side plugin 402. As shown, some of the steps are performed by content provider system 206 (i.e., by server-side plugin 402 residing on content provider system 206). Some of the steps are performed by a SSP gateway 502, an authentication server 504, and a timing record manager 506. SSP gateway 502, authentication server 504, and timing record manager 506 may together implement system 100 (e.g., they may be components of network service provider system 202). As such, SSP gateway 502, authentication server 504, and timing record manager 506 may each include any combination of servers, computing devices, and/or other network elements. It will be recognized that SSP gateway 502, authentication server 504, and timing record manager 506 may be combined into any number of servers and/or other types of computing devices (e.g., a single server).

In step 508, server-side plugin 402 transmits, at time T1', an authentication request to SSP gateway 502. The authentication request may include an ID ("SspID") of the server-side plugin 402, a password, and data representative of T1'. SSP gateway 502 receives the authentication request at time T2.

In step 510, SSP gateway 502 forwards the authentication request to authentication server 504. The forwarded authentication request may include SspID, the password, and an IP address ("IPweb") of content provider system 206.

Authentication server 504 may authenticate the server-side plugin 402 based on the forwarded authentication request. Upon successful authentication, authentication server 504 transmits an authentication response back to SSP gateway 502 (step 512). The authentication response includes an access token ("AccessToken").

SSP gateway 502 receives the authentication response at time T3. In step 514, SSP gateway 502 forwards the authentication response to content provider system 206. The forwarded authentication response includes AccessToken and data representative of T2 and T3.

Content provider system 206 receives the authentication response at time T4'. In step 516, server-side plugin 402 computes a clock skew ("θ"). This may be performed in any suitable manner. For example, the clock skew may be computed as per RFC5905 in accordance with the following equation: $\theta=\{(T2-T1')+(T3-T4')\}/2$.

In step 518, at time T5', server-side plugin 402 transmits an Sspinit message that includes data representative of the clock skew to SSP gateway 502. As shown, the Sspinit includes AccessToken, data representative of time T5', and $\theta$. SSP gateway 502 receives the Sspinit message at time T6 and validates the Sspinit message with authentication server 504 in steps 520 and 522.

In step 524, SSP gateway 502 forwards the Sspinit message to timing record manager 506. Timing record manger 506 receives the Sspinit message at time T7. In response, timing record manager 506 transmits an OK message to SSP gateway 502 in step 526. SSP gateway 502 receives the OK message at time T8, and forwards the OK message together with data representative of times T6 and T8 to content provider system 206 (step 528). In step 530, server-side plugin 402 again computes the clock skew $\theta$. The newly computed clock skew may then be included in a future message to timing record manager 506.

Figure 6:
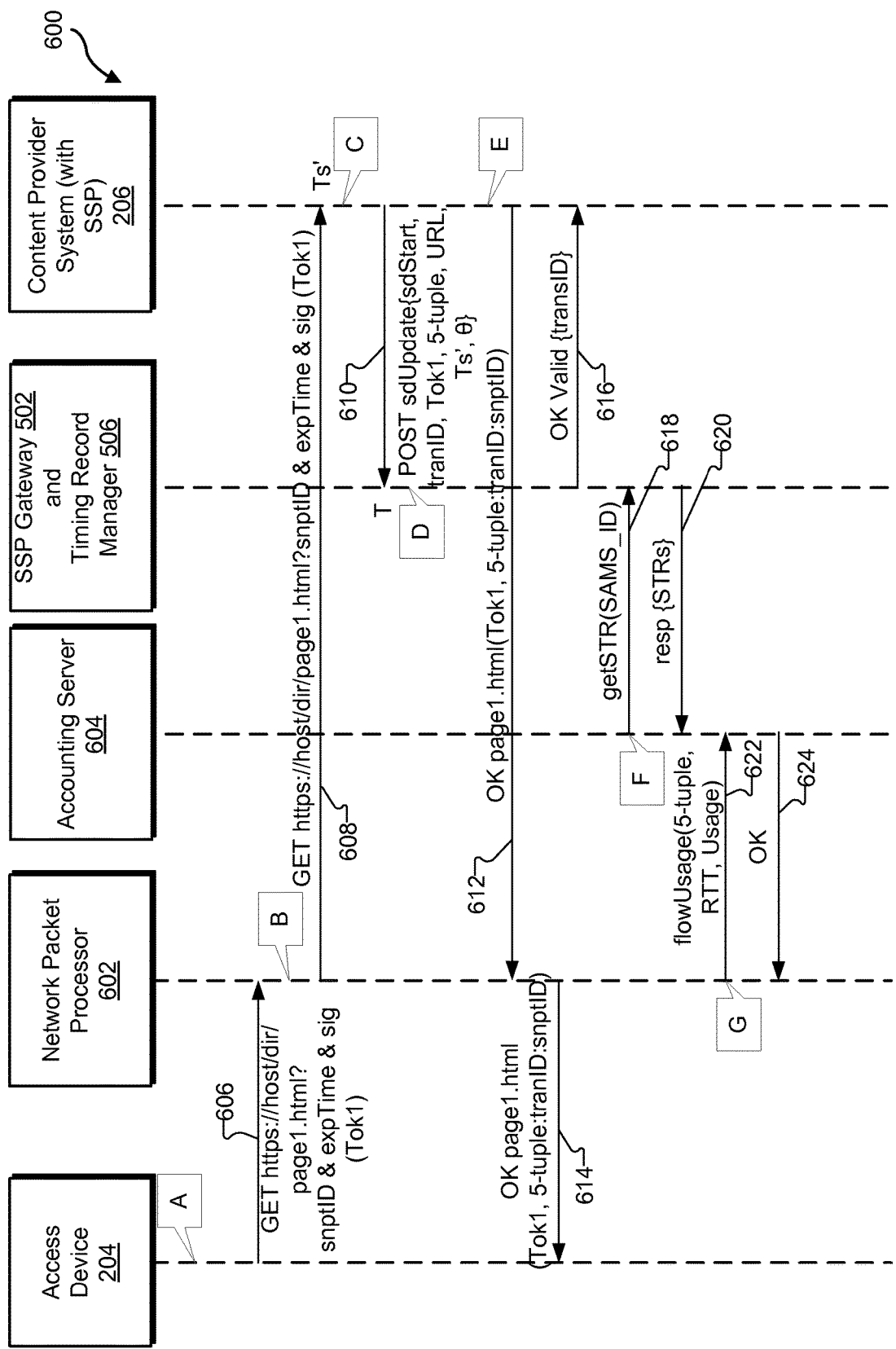
FIG. 6 shows an exemplary call flow that illustrates various calls that are made in order to provide a user of an access device with subsidized access to network content maintained by a content provider system according to principles described herein.

FIG. 6 shows an exemplary call flow 600 that illustrates various calls that are made in order to provide a user of access device 204 with subsidized access to network content maintained by content provider system 206. As shown, some of the steps are performed by access device 204 and content provider system 206 (i.e., by server-side plugin 402 residing on content provider system 206). Some of the steps are also performed by SSP gateway 502, timing record manager 506, a network packet processor 602, and an accounting server 604. Network packet processor 602 and accounting server 604 may be implementation components of system 100 (e.g., they may be components of network service provider system 202). As such, network packet processor 602 and accounting server 604 may each include any combination of servers, computing devices, and/or other network elements. It will be recognized that network packet processor 602, accounting server 604, SSP gateway 502, and timing record manager 506 may be combined into any number of servers and/or other types of computing devices (e.g., a single server).

At callout "A", access device 204 has loaded a webpage provided by content provider system 206, thereby establishing a communication session between access device 204 and content provider system 206. With the webpage already loaded, a user selects an authorized sponsored data link (i.e., the modified link described above) included in the webpage. In response, access device 204 transmits a request for network content associated with the link to network packet processor 602. This request is represented in FIG. 6 by GET call 606. As shown, GET call 606 includes the URI associated with the network content, the snippet ID assigned by system 100, the expiration time specified by system 100, and a signature ("Tok1") generated (e.g., by encrypting the MDN and/or other data) by system 100. The signature may include data representative of an identifier (e.g., an MDN) of access device 204. In the example of FIG. 6, the establishment of the communication session occurs prior to the request being provided by access device 204 to access the network content. However, in alternative embodiments, the establishment of the communication session occurs in response to the request being provided by access device 204 to access the network content.

At callout "B", network packet processor 602 determines that a data usage charge associated with the network content is subsidized by the content provider associated with content provider system 206. For example, network packet processor 602 may detect the URI included in GET call 606 and determine that the URI matches a URI included in the rule set associated with the subsidized access arrangement between the content provider and the network service provider.

In some examples, network packet processor 602 may begin, in response to receiving GET call 606, tracking an amount of data transmitted between access device 204 and content provider system 206 during the communication session. For example, as will be illustrated below, network packet processor 602 may track an amount of ingress and egress data transmitted between access device 204 and content provider system 206 during each of a plurality of time bins.

At call 608, network packet processor 602 forwards the GET call 606 to content provider system 206. Content provider system 206 receives call 608 at time Ts'. At callout "C", content provider system 206 detects Tok1 in the request and invokes the server-side plugin 402. Server-side plugin 402 verifies that the expiration time included in the request has not expired and that the request is not part of a previous sponsored data transaction. In response, server-side plugin 402 creates a transaction ID ("tranID") and sends an sdUpdate message to timing record manager 506 via SSP gateway 502 that notifies timing record manager 506 that a secure connection is being established between access device 204 and content provider system 206. The message is transmitted in the form of a POST call 610, which includes data representative of a start time ("sdStart") indicating a time during the communication session at which access device 204 starts accessing the network content, the transaction ID (i.e., tranID), the signature (i.e., Tok1), 5-tuple data (i.e., data representative of a source IP address and a port number associated with access device 204, a destination IP address and port number associated with content provider system 206, and a protocol being used for the secure connection), the URL of the network content, and the clock skew (i.e., $\theta$). Content provider system 206 may periodically transmit similar POST calls in order to provide timing record manager 506 with updated data while the user continues to access the network content.

At callout "D", timing record manager 506 may determine that the signature, snippet ID, and expiration time (matched against Ts'-$\theta$) included in the sdUpdate message are valid. In response, timing record manager 506 may decrypt Tok1 to determine the identifier (e.g., the MDN) of access device 204. Timing record manager 506 may then write a usage record for the access device 204 to a database.

At callout "E", content provider system 206 establishes the secure connection with access device 204 by transmitting a response to the request represented by GET call 608 to access device 204 via network packet processor 602. This is represented by OK calls 612 and 614. As shown, these calls include Tok1, the 5-tuple data, tranID, and the snippet ID.

In step 616, SSP gateway 502 transmits to content provider system 206 an OK message that indicates that the POST call 610 is valid.

At callout "F", accounting server 604 syncs its own usage record database with the usage record database maintained by timing record manager 506. This may be performed periodically (e.g., every second) and is represented by data calls 618 and 620.

At callout "G", network packet processor 602 periodically provides accounting server 604 with data representative of the tracked ingress and egress data transmitted between access device 204 and content provider system 206 while the user accesses the network content by way of the secure connection. This is represented by data calls 622 and 624. The accounting server 604 may then determine an amount of data that is to be charged to the content provider based on the tracked data and the usage records.

In some examples, server-side plugin 402 may also provide data identifying an end time that indicates a time during the communication session at which access device 204 stops accessing the network content (e.g., when the secure connection terminates). System 100 may use the end time data to determine when to stop charging the content provider for data transmitted between access device 204 and content provider system 206 during the communication session.

Figure 7:
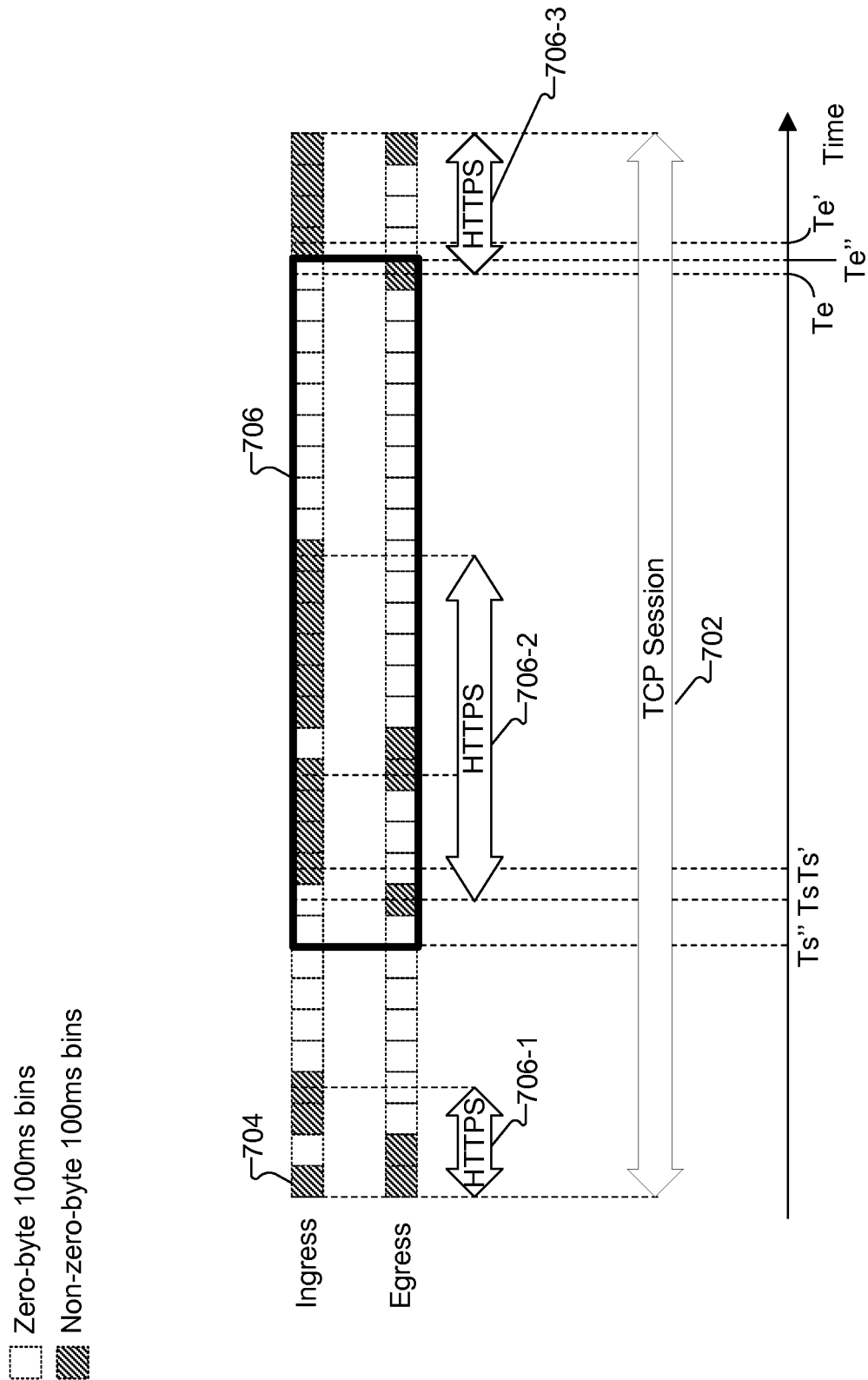
FIG. 7 shows an exemplary scenario in accordance with the methods and systems described herein.

In some examples, system 100 may adjust the start time and/or the end time in order to account for a round trip time ("RTT") between system 100 and content provider system 206. To illustrate, FIG. 7 shows an exemplary scenario in which system 100 adjusts both the start time and the end time as reported by server-side plugin 402 to account for the RTT between system 100 and content provider system 206.

As illustrated by arrow 702, a TCP session may be established between access device 204 and content provider system 206. During the TCP session, system 100 may track the ingress data (i.e., data transmitted from content provider system 206 to access device 204) and the egress data (i.e., data transmitted from access device 204 to content provider system 206). System 100 may track this data by counting bytes of data transmitted during each of a plurality of time bins (e.g., time bin 704). In the example of FIG. 7, non-shaded time bins are "zero-byte bins" (i.e., no data is transmitted during the non-shaded time bins). Shaded time bins are "non-zero-byte bins" (i.e., some amount of data is transmitted during the shaded time bins). As described above, system 100 may maintain TCP flow usage records that indicate how many bytes are transmitted during each time bin. In the example of FIG. 7, each time bin is 100 milliseconds in length. However, each time bin may alternatively be of any other length of time.

During the TCP session, access device 204 may establish a number of different secure connections with content provider system 206. Each secure connection may last for an amount of time, which may be referred to as an HTTPS session. In the particular example of FIG. 7, three HTTPS sessions 706-1 through 706-3 (collectively "HTTPS sessions 706) are established during TCP session 702. HTTPS sessions 706-1 and 706-3 are not sponsored (i.e., a data usage charge incurred when data is transmitted between access device 204 and content provider system 206 during HTTPS sessions 706-1 and 706-3 is not subsidized by the content provider). However, HTTPS session 706-2 is sponsored by the content provider.

To determine how much data is to be charged to the content provider for HTTPS session 706-2, system 100 receives, from the server-side plugin 402, data representative of a start time and an end time associated with the HTTPS session 706-2. In FIG. 7, the start time as reported by server-side plugin 402 is Ts'. However, the actual start time of HTTPS session 706-2 is Ts. This difference is due, in part, to a RTT delay between system 100 and content provider system 206. Likewise, the end time as reported by server-side plugin 402 is Te' (in this example, the end time is defined by the start time of the next HTTPS session 706-3). However, the actual end time of HTTPS session 706-2 (as defined by the start time of HTTPS session 706-3) is Te. This difference is also due at least in part to the RTT delay. Hence, system 100 may adjust the start and end times to Ts" and Te", respectively, when determining what data to charge to the content provider in order to compensate for the RTT delay. In this manner, system 100 may ensure that the user is not charged for more data than he or she should be charged. The adjusted start and end times may be adjusted by any suitable amount as may serve a particular implementation. In the example of FIG. 7, the data included in the time bins surrounded by box 708 is charged to the content provider.

Figure 8:
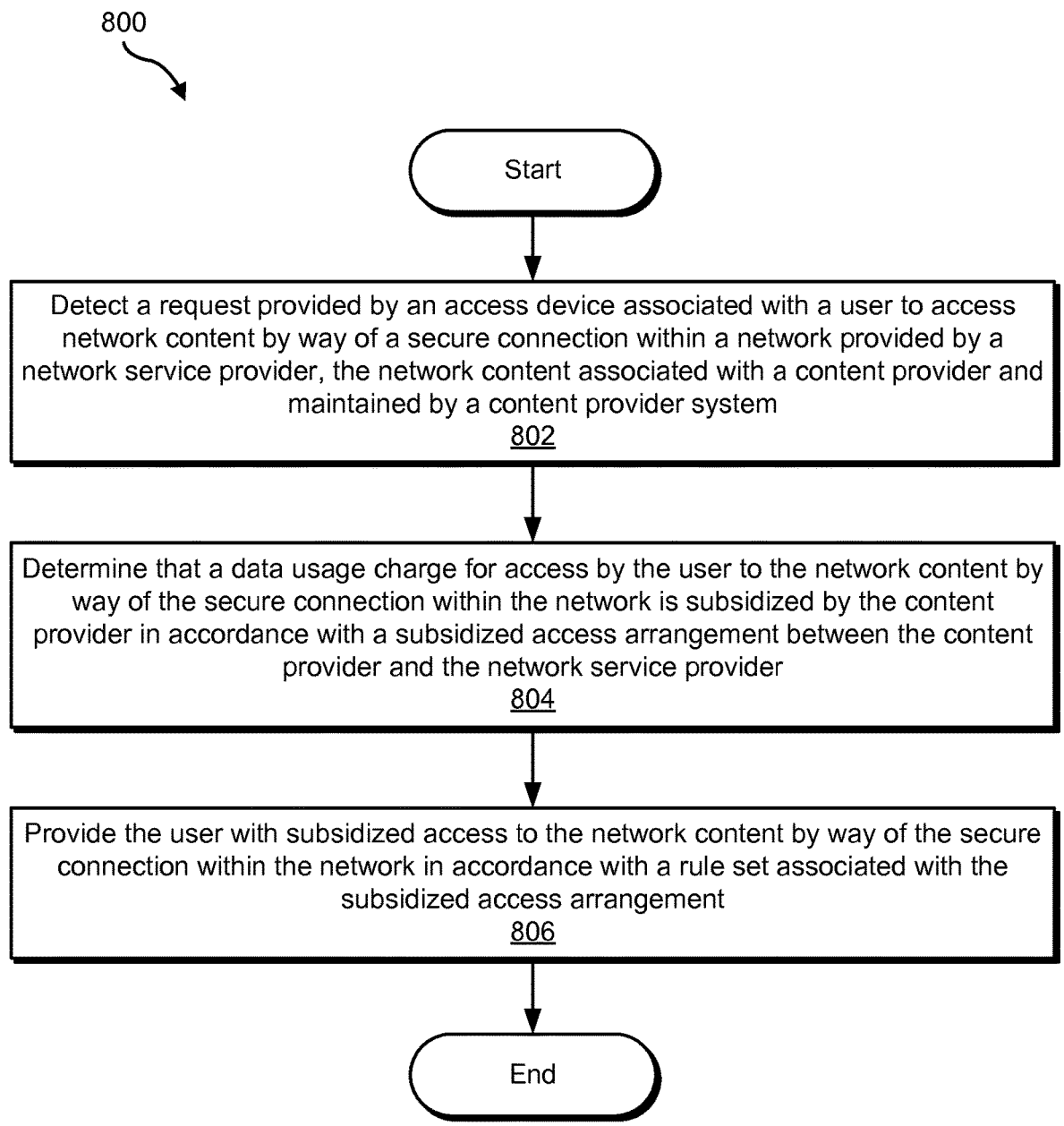
FIG. 8 illustrates an exemplary method of providing subsidized access to network content by way of a secure connection according to principles described herein.

FIG. 8 illustrates an exemplary method 800 of providing subsidized access to network content by way of a secure connection. While FIG. 8 illustrates exemplary steps according to one embodiment, other embodiments may omit, add to, reorder, and/or modify any of the steps shown in FIG. 8. One or more of the steps shown in FIG. 8 may be performed by system 100 and/or any implementation thereof.

In step 802, a subsidized access management system detects a request provided by an access device associated with a user to access network content by way of a secure connection within a network provided by a network service provider. As described above, the network content is associated with a content provider and maintained by a content provider system. Step 802 may be performed in any of the ways described herein.

In step 804, the subsidized access management system determines that a data usage charge for access by the user to the network content by way of the secure connection within the network is subsidized by the content provider in accordance with a subsidized access arrangement between the content provider and the network service provider. Step 804 may be performed in any of the ways described herein.

In step 806, the subsidized access management system provides the user with subsidized access to the network content by way of the secure connection within the network in accordance with a rule set associated with the subsidized access arrangement. Step 806 may be performed in any of the ways described herein. The subsidized access management system may subsequently bill the content provider for the determined amount of data.

Figure 9:
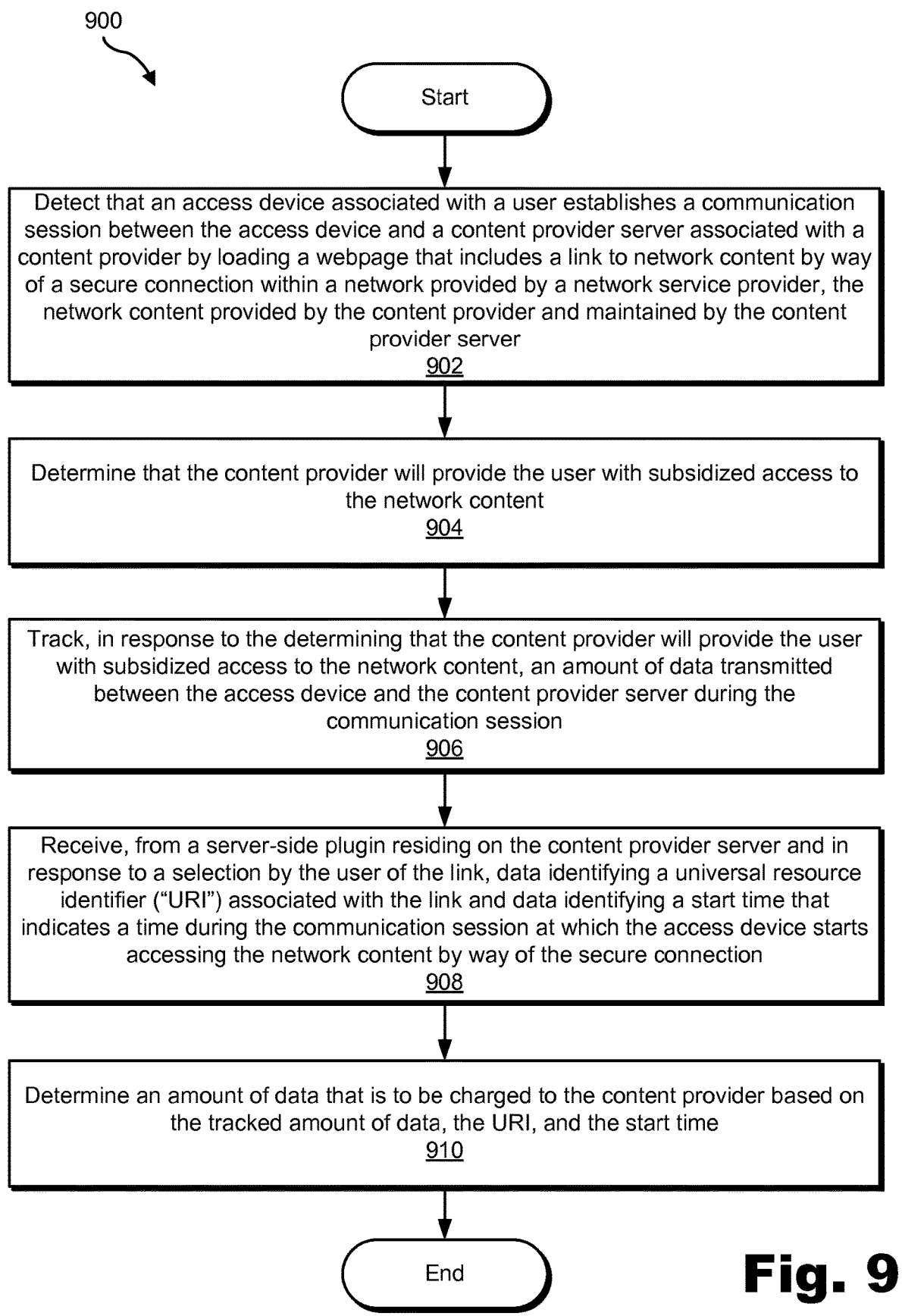
FIG. 9 illustrates another exemplary method of providing subsidized access to network content by way of a secure connection according to principles described herein.

FIG. 9 illustrates another exemplary method 900 of providing subsidized access to network content by way of a secure connection. While FIG. 9 illustrates exemplary steps according to one embodiment, other embodiments may omit, add to, reorder, and/or modify any of the steps shown in FIG. 9. One or more of the steps shown in FIG. 9 may be performed by system 100 and/or any implementation thereof.

In step 902, a subsidized access management system detects that an access device associated with a user establishes a communication session between the access device and a content provider server associated with a content provider by loading a webpage that includes a link to network content by way of a secure connection within a network provided by a network service provider. As described above, the network content is provided by the content provider and maintained by the content provider server. Step 902 may be performed in any of the ways described herein.

In step 904, the subsidized access management system determines that the content provider will provide the user with subsidized access to the network content. Step 904 may be performed in any of the ways described herein.

In step 906, the subsidized access management system tracks, in response to determining that the content provider will provide the user with subsidized access to the network content, an amount of data transmitted between the access device and the content provider server during the communication session. Step 906 may be performed in any of the ways described herein.

In step 908, the subsidized access management system receives, from a server-side plugin residing on the content provider server and in response to a selection by the user of the link, data identifying a URI associated with the link and data identifying a start time that indicates a time during the communication session at which the access device starts accessing the network content by way of the secure connection. Step 908 may be performed in any of the ways described herein.

In step 910, the subsidized access management system determines an amount of data that is to be charged to the content provider based on the tracked amount of data, the URI, and the start time. Step 910 may be performed in any of the ways described herein. The subsidized access management system may subsequently bill the content provider for the determined amount of data.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
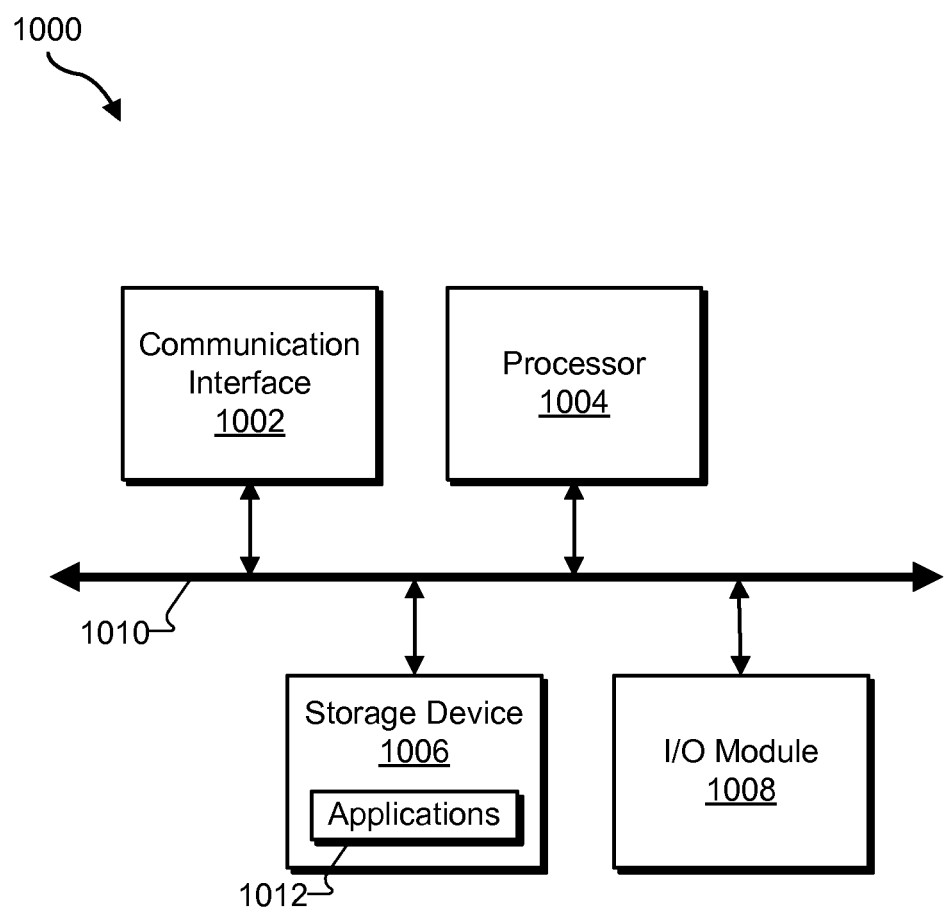
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components and/or configuration of components illustrated in FIG. 10 are not intended to be limiting. Additional or alternative components and/or configurations of components may be used in other embodiments. For example, in addition or alternative to being communicatively connected by way of communication infrastructure 1010, one or more components of computing device 1000 may be communicatively connected by way of one or more other suitable interfaces. For instance, communication interface 1002, storage device 1006, I/O module 1008, and/or any other components of computing device 1000 may be communicatively coupled directly to processor 1004 via one or more interfaces (e.g., discrete interfaces). Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with detection facility 102 and/or subsidized access management facility 104. Likewise, storage facility 106 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a subsidized access management system, an establishment of a communication session between an access device and a content provider system by way of a secure connection within a network;
   receiving, by a network packet processor included in the subsidized access management system, a data call from the access device and that includes a universal resource identifier ("URI") of network content associated with a secure link included in a webpage and code representative of a snippet identifier that identifies a subsidized access arrangement between a content provider and a network service provider;
   determining, by the network packet processor included in the subsidized access management system based on the URI, that a data usage charge for access by the access device to the network content by way of the secure connection within the network is subsidized by the content provider in accordance with the subsidized access arrangement between the content provider and the network service provider;
   tracking, by the network packet processor included in the subsidized access management system in response to the receiving of the data call, an amount of data transmitted between the access device and the content provider system during the communication session;
   forwarding, by the network packet processor included in the subsidized access management system, the data call to the content provider system;
   receiving, by a server-side plugin gateway ("SSP gateway") included in the subsidized access management system from a server-side plugin residing on the content provider system, a message identifying the URI associated with the network content and a start time that indicates a time during the communication session at which the access device starts accessing the network content by way of the secure connection;
   transmitting, by the SSP gateway included in the subsidized access management system, the message to a timing record manager included in the subsidized access management system;
   writing, by the timing record manager included in the subsidized access management system based on the message, a data usage record for the access device to a usage record database;
   transmitting, by the network packet processor included in the subsidized access management system to an accounting server included in the subsidized access management system, tracking data representative of the amount of the tracked amount of data transmitted between the access device and the content provider system during the communication session; and
   determining, by the accounting server included in the subsidized access management system based on the tracking data, the data usage record, and the start time, an amount of data included in the tracked amount of data that is to be subsidized by the content provider.

2. The method of claim 1, further comprising:
   receiving, by the subsidized access management system from the content provider system prior to a user of the access device selecting the secure link, data representative of an original URI for the network content, the data being transmitted by the content provider system to the subsidized access management system in response to the access device loading the webpage that includes an original link associated with the original URI;
   determining, by the subsidized access management system in response to the receiving of the data representative of the original URI, that the user is eligible to receive subsidized access to the network content and that the content provider has enough quota to provide the user with the subsidized access to the network content;
   creating, by the subsidized access management system in response to the determining that the user is eligible and that the content provider has enough quota, a modified URI that includes the original URI combined with data indicating that the user is eligible to receive the subsidized access to the network content for a predetermined amount of time; and
   directing, by the subsidized access management system, the content provider system to replace the original link within the webpage with a modified link associated with the modified URI, wherein the modified link is the secure link.

3. The method of claim 2, wherein the establishment of the communication session is performed in response to the selection by the user of the secure link.

4. The method of claim 2, wherein the original link is a secure link.

5. The method of claim 1, wherein the determining that the data usage charge is subsidized by the content provider comprises:
   determining that the URI matches a URI included in a rule set.

6. The method of claim 1, wherein the establishment of the communication session occurs prior to a request being provided by the access device to access the network content by way of the secure connection.

7. The method of claim 1, wherein the establishment of the communication session occurs in response to a request being provided by the access device to access the network content by way of the secure connection.

8. The method of claim 1, wherein the tracking of the amount of data comprises counting an amount of ingress and egress data transmitted between the access device and the content provider system during each of a plurality of time bins.

9. The method of claim 8, wherein the time bins are each about 100 milliseconds.

10. The method of claim 1, further comprising:
receiving, by the subsidized access management system from the server-side plugin residing on the content provider system, data identifying an end time that indicates a time during the communication session at which the access device stops accessing the network content; and
the determining of the amount of data that is to be subsidized by the content provider is further based on the end time.

11. The method of claim 10, further comprising adjusting, by the subsidized access management system, at least one of the start time and the end time to account for a round trip time between the subsidized access management system and the content provider system.

12. The method of claim 1, wherein the communication session comprises a Transmission Control Protocol ("TCP") session.

13. The method of claim 1, wherein the secure connection comprises a Transport Layer Security ("TLS") or a Secure Sockets Layer ("SSL") connection.

14. A subsidized access management system comprising:
a network packet device comprising a network packet processor and a network packet memory storing executable instructions that, when executed by the network packet processor, cause the network packet processor to perform functions of:
detecting an establishment of a communication session between an access device and a content provider system by way of a secure connection within a network,
receiving a data call from the access device and that includes a universal resource identifier ("URI") of network content associated with a secure link included in a webpage and code representative of a snippet identifier that identifies a subsidized access arrangement between a content provider and a network service provider,
determining, based on the URI, that a data usage charge for access by the access device to the network content by way of the secure connection within the network is subsidized by the content provider in accordance with the subsidized access arrangement between the content provider and the network service provider,
tracking, in response to the receiving of the data call, an amount of data transmitted between the access device and the content provider system during the communication session, and
forwarding the data call to the content provider system;
a server-side plugin gateway ("SSP gateway") configured to
receive, from a server-side plugin residing on the content provider system, a message identifying the URI associated with the network content and a start time that indicates a time during the communication session at which the access device starts accessing the network content by way of the secure connection, and
transmit the message;
a timing record manager configured to
receive the message from the SSP gateway, and
write, based on the message, a data usage record for the access device to a usage record database; and
an accounting server communicatively coupled to the timing record manager and to the network packet device and comprising an accounting server memory and an accounting server processor, the accounting server memory storing executable instructions that, when executed by the accounting server processor, cause the accounting server processor to perform functions of:
receiving, from the network packet device, tracking data representative of the amount of the tracked amount of data transmitted between the access device and the content provider system during the communication session, and
determining, based on the tracking data, the data usage record, and the start time, an amount of data included in the tracked amount of data that is to be subsidized by the content provider.

15. The method of claim 1, further comprising initializing, by the subsidized access management system in response to the establishment of the communication session, the server-side plugin residing on the content provider system, the initializing configured to synchronize a clock used by the content provider system and a clock used by the subsidized access management system.

16. The method of claim 15, wherein the initializing of the server-side plugin residing on the content provider system comprises:
receiving, at the SSP gateway included in the subsidized access management system and at a time T2, an authentication request transmitted by the server-side plugin at a time T1', the authentication request including an identifier of the server-side plugin and data representative of the time T1';
forwarding, from the SSP gateway to an authentication server included in the subsidized access management system, the authentication request;
authenticating, at the authentication server based on the identifier of the server-side plugin, the authentication request;
transmitting, from the authentication server to the SSP gateway, an authentication response that includes an access token, the SSP gateway receiving the authentication response at a time T3;
forwarding, from the SSP gateway to the content provider system, the authentication response, the forwarded authentication response including the access token and data representative of the times T2 and T3, the content provider system receiving the forwarded authentication response at a time T4;
receiving, at the SSP gateway and at a time T6, a message transmitted by the server-side plugin at a time T5', the message transmitted by the server-side plugin including data representative of a clock skew computed by the server-side plugin in accordance with the following equation: $\theta = \{(T2-T1')+(T3-T4')\}/2$, where $\theta$ is the clock skew;

validating, at the SSP gateway with the authentication server, the message transmitted by the server-side plugin;

forwarding, from the SSP gateway to the timing record manager, the message transmitted by the server-side plugin subsequent to the validating, the timing record manager receiving the forwarded message at a time T7;

transmitting, from the timing record manager to the SSP gateway in response to the timing record manager receiving the forwarded message, an OK message to the SSP gateway, the SSP gateway receiving the OK message at a time T8; and forwarding, from the SSP gateway to the content provider system, the OK message together with data representative of times T6 and T8, wherein the server-side plugin computes an updated clock skew, the updated clock skew configured to be used to transmit the start time to the subsidized access management system.

17. The subsidized access management system of claim 14, further comprising an authentication server communicatively coupled to the SSP gateway and comprising an authentication server memory and an authentication server processor, wherein:

the SSP gateway is further configured to receive, at a time T2, an authentication request transmitted by the server-side plugin at a time T1', the authentication request including an identifier of the server-side plugin and data representative of the time T1', and forward, to the authentication server, the authentication request;

the authentication server memory stores executable instructions that, when executed by the authentication server processor, cause the authentication server processor to perform functions of:

authenticating, based on the identifier of the server-side plugin, the authentication request, and transmitting, to the SSP gateway, an authentication response that includes an access token, the SSP gateway receiving the authentication response at a time T3;

the SSP gateway is further configured to forward, to the content provider system, the authentication response, the forwarded authentication response including the access token and data representative of the times T2 and T3, the content provider system receiving the forwarded authentication response at a time T4, receive, at a time T6, a message transmitted by the server-side plugin at a time T5', the message including data representative of a clock skew computed by the server-side plugin in accordance with the following equation: $\theta=\{(T2-T1')+(T3-T4')\}/2$, where $\theta$ is the clock skew, validate the message transmitted by the server-side plugin with the authentication server, and forward, to the timing record manager, the message subsequent to the validating, the timing record manager receiving the forwarded message at a time T7;

the timing record manager is further configured to transmit to the SSP gateway in response to the timing record manager receiving the forwarded message, an OK message to the SSP gateway, the SSP gateway receiving the OK message at a time T8; and the SSP gateway is further configured to forward, to the content provider system, the OK message together with data representative of times T6 and T8, wherein the server-side plugin computes an updated clock skew, the updated clock skew configured to be used to transmit the start time to the subsidized access management system.

* * * * *